(12) United States Patent
Beyer et al.

(10) Patent No.: US 11,203,667 B2
(45) Date of Patent: Dec. 21, 2021

(54) LOW TEMPERATURE CURE SILICONE ELASTOMER

(71) Applicant: DOW SILICONES CORPORATION, Midland, MI (US)

(72) Inventors: Patrick Beyer, Mainz (DE); Ivonne Hankammer, Wiesbaden (DE); Hans Peter Wolf, Liederbach (DE)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 16/942,872

(22) Filed: Jul. 30, 2020

(65) Prior Publication Data

US 2020/0354525 A1   Nov. 12, 2020

Related U.S. Application Data

(63) Continuation of application No. 16/078,267, filed as application No. PCT/EP2017/053929 on Feb. 21, 2017, now Pat. No. 10,774,184.

(30) Foreign Application Priority Data

Feb. 23, 2016 (GB) .................................. 1603107

(51) Int. Cl.

| | | |
|---|---|---|
| *C08L 83/04* | (2006.01) | |
| *C08G 77/12* | (2006.01) | |
| *C08G 77/20* | (2006.01) | |
| *C08K 3/36* | (2006.01) | |
| *C08K 5/05* | (2006.01) | |
| *C08K 9/06* | (2006.01) | |
| *C08L 83/00* | (2006.01) | |
| *C08K 5/56* | (2006.01) | |
| *B29C 64/124* | (2017.01) | |
| *B01J 23/42* | (2006.01) | |
| *C08G 77/08* | (2006.01) | |
| *B33Y 70/00* | (2020.01) | |

(52) U.S. Cl.
CPC .............. *C08G 77/12* (2013.01); *B01J 23/42* (2013.01); *B29C 64/124* (2017.08); *C08G 77/08* (2013.01); *C08G 77/20* (2013.01); *C08K 3/36* (2013.01); *C08K 5/05* (2013.01); *C08K 5/56* (2013.01); *C08K 9/06* (2013.01); *C08L 83/00* (2013.01); *C08L 83/04* (2013.01); *B33Y 70/00* (2014.12)

(58) Field of Classification Search
None
See application file for complete search history.

(56) References Cited

U.S. PATENT DOCUMENTS

| | | | |
|---|---|---|---|
| 3,445,420 A * | 5/1969 | Kookootsedes | ........ C08L 83/04 524/862 |
| 4,162,243 A | 7/1979 | Lee et al. | |
| 4,500,659 A | 2/1985 | Kroupa et al. | |
| 5,110,845 A | 5/1992 | Gray et al. | |
| 5,334,687 A | 8/1994 | Ikeno | |
| 5,364,922 A | 11/1994 | Bilgrien et al. | |
| 5,380,812 A | 1/1995 | Lutz et al. | |
| 5,563,211 A | 10/1996 | Kosal et al. | |
| 5,604,288 A | 2/1997 | Furukawa et al. | |
| 5,674,966 A | 10/1997 | McDermott et al. | |
| 5,760,145 A | 6/1998 | Herzig et al. | |
| 5,908,878 A * | 6/1999 | Baity | ................ C08L 83/04 523/203 |
| 6,017,587 A | 1/2000 | Kleyer et al. | |
| 6,107,434 A | 8/2000 | Lewis | |
| 6,300,426 B1 | 10/2001 | Koyama et al. | |
| 6,483,981 B1 | 11/2002 | Krahn et al. | |
| 6,518,371 B1 | 2/2003 | Fink et al. | |
| 8,063,137 B2 | 11/2011 | Jeram et al. | |
| 9,902,811 B2 | 2/2018 | Dent et al. | |
| 10,774,184 B2 * | 9/2020 | Beyer | ................ C08G 77/08 |
| 2002/0146575 A1 | 10/2002 | Shudo | |
| 2005/0089696 A1 | 4/2005 | Bosshammer | |
| 2006/0009577 A1 | 1/2006 | Hara | |
| 2006/0073347 A1 | 4/2006 | Morita et al. | |
| 2006/0128881 A1 | 6/2006 | George et al. | |
| 2006/0173150 A1 | 8/2006 | Brummer et al. | |
| 2007/0106015 A1 | 5/2007 | Zhu et al. | |
| 2007/0134425 A1 | 6/2007 | Morita et al. | |
| 2008/0255304 A1 | 10/2008 | Nakashima et al. | |

(Continued)

FOREIGN PATENT DOCUMENTS

| | | |
|---|---|---|
| CN | 1738867 A | 2/2006 |
| CN | 104130581 A | 11/2014 |

(Continued)

OTHER PUBLICATIONS

PCT/EP2017/053929 International Search Report dated Feb. 21, 2017, 4 pages.

(Continued)

*Primary Examiner* — Robert S Loewe
(74) *Attorney, Agent, or Firm* — Warner Norcross + Judd LLP

(57) ABSTRACT

A liquid curable silicone elastomer composition is disclosed. The liquid curable silicone elastomer composition comprises an organopolysiloxane (A) containing at least two silicon-bonded alkenyl groups per molecule, an organopolysiloxane (B) containing at least three silicon-bonded hydrogen atoms per molecule, a platinum based catalyst (C), an inhibitor (D), and a silica filler (E). The organopolysiloxane (B) is a branched (or resinous) polymer, contains M siloxy units, and the at least three silicon-bonded hydrogen atoms are present on the M siloxy units. The inhibitor (D) is selected from the group consisting of acetylenic alcohols and their derivatives. The inhibitor (D) is present in the liquid curable silicone elastomer composition in an amount to provide a molar ratio—of the inhibitor (D) to platinum in the catalyst (C)—of from 150 to 900 (150:1 to 900:1).

20 Claims, No Drawings

(56) References Cited

U.S. PATENT DOCUMENTS

| | | |
|---|---|---|
| 2011/0160410 A1 | 6/2011 | Sagawa et al. |
| 2011/0224344 A1 | 9/2011 | Fujisawa et al. |
| 2012/0161066 A1 | 6/2012 | Hirabayashi et al. |
| 2013/0274398 A1 | 10/2013 | Shiobara et al. |
| 2014/0179863 A1 | 6/2014 | Kato |
| 2015/0299543 A1 | 10/2015 | Miyamoto |
| 2016/0122611 A1 | 5/2016 | Yoshida et al. |
| 2017/0342295 A1 | 11/2017 | Hasegawa et al. |
| 2018/0186076 A1 | 7/2018 | Backer et al. |
| 2019/0040204 A1 | 2/2019 | Beyer et al. |
| 2019/0055362 A1 | 2/2019 | Igarashi |

FOREIGN PATENT DOCUMENTS

| | | |
|---|---|---|
| EP | 0251435 A1 | 1/1988 |
| JP | H0395267 A | 4/1991 |
| JP | H0565417 A | 3/1993 |
| JP | H05186696 A | 7/1993 |
| JP | H06345969 A | 12/1994 |
| JP | H11228835 A | 8/1999 |
| JP | 2006083392 A | 3/2006 |
| JP | 2009515027 A | 4/2009 |
| JP | 2013221075 A | 10/2013 |
| JP | 2017145364 A | 8/2017 |
| WO | 2004046233 A1 | 6/2004 |
| WO | 2008056810 A1 | 5/2008 |
| WO | 2008126658 A1 | 10/2008 |
| WO | WO2009088472 A1 | 7/2009 |
| WO | 2014108364 A1 | 7/2014 |

OTHER PUBLICATIONS

Machine assisted English translation of JPH0395267A obtained from https://worldwide.espacenet.com on Jan. 27, 2020, 8 pages.
Machine assisted English translation of JPH05186696A obtained from https://patents.google.com on Jan. 27, 2020, 8 pages.
Machine assisted English translation of JPH06345969A obtained from https://patents.google.com on Jan. 27, 2020, 6 pages.
Machine assisted English translation of JPH11228835A obtained from https://patents.google.com on Jan. 27, 2020, 9 pages.
Machine assisted English translation of JP2006083392A obtained from https://patents.google.com on Jan. 27, 2020, 8 pages.
Machine assisted English translation of CN104130581A obtained from https://patents.google.com on Oct. 20, 2020, 6 pages.

\* cited by examiner

LOW TEMPERATURE CURE SILICONE ELASTOMER

CROSS-REFERENCE TO RELATED APPLICATIONS

This application is a Continuation of National Stage Application No. 16/078,267 filed on 21 Aug. 2018, which claims priority to and all advantages of International Application No. PCT/EP2017/053929 filed on 21 Feb. 2017, which claims priority to and all advantages of GB Patent Application No. 1603107.2 filed on 23 Feb. 2016, the contents of which are hereby incorporated by reference.

The present invention relates to liquid silicone elastomer compositions which can cure at temperatures<140° C. Also included is a process for preparing the cured silicone elastomer and articles and composite parts made from said compositions.

Liquid curable silicone elastomer compositions typically cure or react to provide cured silicone elastomers, also referred to as silicone rubbers. The terms silicone rubber and silicone elastomer may be used interchangeably. Liquid curable silicone elastomer compositions include platinum cured silicone elastomers (addition reaction, otherwise known as hydrosilylation).

Cured silicone elastomers may be found in a wide variety of applications such as automotive applications; electronics; electric connectors; medical devices and healthcare applications; cooking, baking, and food storage products; infant products such as bottle nipples; apparel such as undergarments, sportswear, and footwear; and in home repair and hardware.

In some instances, the silicone elastomer may be overmoulded onto other parts made of different or same materials or may be coated on textile or fabric. For example a silicone gasket can be moulded onto a thermoplastic housing, made from polyamide or polybutylene terephthalate. In another example a wearable electronic device can be obtained by overmoulding a hard thermoplastic such as polycarbonate with a soft layer or part made of liquid silicone rubber. Further examples include an airbag fabric coated with a silicone elastomer.

Typical properties expected from cured silicone elastomers include low compression set, stability and ability to resist extreme temperatures; heat resistance; tactile properties; chemical inertness; wear and/or scratch resistance.

Organopolysiloxanes may generally be described as polymers having multiple units of the formula (I):

$$R_aSiO_{(4-a)/2} \qquad (I)$$

in which R is independently selected from hydrogen, aliphatic hydrocarbyl, aromatic hydrocarbyl, or organyl group (that is any organic substituent group, regardless of functional type, having one free valence at a carbon atom). Saturated aliphatic hydrocarbyls are exemplified by, but not limited to alkyl groups such as methyl, ethyl, propyl, pentyl, octyl, undecyl, and octadecyl and cycloalkyl groups such as cyclohexyl. Unsaturated aliphatic hydrocarbyls are exemplified by, but not limited to, alkenyl groups such as vinyl, allyl, butenyl, pentenyl, cyclohexenyl and hexenyl; and by alkynyl groups. Aromatic hydrocarbon groups are exemplified by, but not limited to, phenyl, tolyl, xylyl, benzyl, styryl, and 2-phenylethyl. Organyl groups are exemplified by, but not limited to, halogenated alkyl groups such as chloromethyl, 3-chloropropyl, and 3,3,3-trifluoropropyl; nitrogen containing groups such as amino groups, amido groups, imino groups, imido groups; oxygen containing groups such as polyoxyalkylene groups, carbonyl groups, alkoxy groups and hydroxyl groups. Further organyl groups may include sulfur containing groups, fluor containing groups, phosphorus containing groups, boron containing groups. The subscript "a" is an integer of from 0 to 3.

Siloxy units may be described by a shorthand (abbreviated) nomenclature, namely—"M," "D," "T," and "Q", when R is a methyl group (further teaching on silicone nomenclature may be found in Walter Noll, Chemistry and Technology of Silicones, dated 1962, Chapter I, pages 1-9). The M unit corresponds to a siloxy unit where a=3, that is $R_3SiO_{1/2}$; the D unit corresponds to a siloxy unit where a=2, namely $R_2SiO_{2/2}$; the T unit corresponds to a siloxy unit where a=1, namely $R_1SiO_{3/2}$; the Q unit corresponds to a siloxy unit where a=0, namely $SiO_{4/2}$.

A typical liquid curable silicone elastomer composition may comprise
an organopolysiloxane (A) containing at least 2 alkenyl groups bonded to silicon atom per molecule,
an organopolysiloxane (B) containing at least 2 silicon-bonded hydrogen atom per molecule,
a platinum based catalyst (C),
an optional inhibitor (D),
an optional silica filler (E).

The platinum based catalyst is added in an amount sufficient to effect and initiate the cure of the organopolysiloxanes (A) and (B). The inhibitor of the platinum based catalyst is optional. It is typically used to stabilize the composition before curing is effected, by inhibiting the cure catalyst. The silica filler may be present to reinforce the cured silicone elastomer and/or to influence the rheological properties of the curable composition in the uncured stage.

A typical molar ratio of inhibitor to the platinum atom of the catalyst usually ranges of from 20 to 100, that is, the molar ratio of inhibitor to the platinum atom is typically comprised of from 20:1 to 100:1.

The cure temperature of a typical liquid curable silicone elastomer composition may range of from 80 to 220° C.

In some instances, the cured silicone elastomer may be used to overmould heat sensitive substrates. Heat sensitive substrates are those that will encounter distortion or deformation problem upon heat contact. The Vicat softening temperature and Heat Deflection (or distortion) Temperature HDT are different techniques describing either surface softening (Vicat) or body softening (HDT).

In the Heat Deflection Temperature method, a prismatic specimen is subjected to flexural loading and the temperature increased at a specified rate. The heat deflection temperature is achieved when the specimen deflects to a distance specified in the Standards. As this temperature naturally depends on the load applied, the specimen geometry, the heating rate and the selected deflection, the heat deflection temperature represents a value which can be used to compare different materials with each other. Heat deflection temperature measurement of plastics under temperature can be affected by internal material stresses. The method is specified in ASTM D 648-07.

The Vicat Softening Temperature was introduced to measurement technology as a substitute value for melting-point. It describes the temperature at which a circular indentor with a cross-section of 1 mm² under a standardized loading of 10 N or 50 N penetrates exactly 1 mm into the specimen (ASTM D 1525-09).

Typical heat sensitive substrates include those substrates made of materials having a Vicat Softening Temperature below 140° C. and which may be impacted by a curable system applied on their surface at a temperature above 140°

C. Vicat Softening Temperature for certain materials may be found in numerous literature sources, and may be exemplified as follows (for 1 kg load): 92° C. for polyvinyl chloride (PVC), 127.3° C. for polyethylene (PE), 156.2° C. for polycarbonate (PC) (further teaching on Vicat Softening Temperature values may be found on www.pvc.org).

To minimise and preferably avoid any distortion (or deformation) problems with heat sensitive substrates, the cure (or moulding) temperature of the selective adhesion liquid curable silicone elastomer composition is preferably minimised without loss of cure speed.

Typically, a reduction of the moulding temperature results in the markedly reduced curing speed of the silicone rubber, and hence, longer moulding time. Rapid cure rate is however necessary to ensure economic viability of injection moulding processes.

Advantages of reducing the curing (or moulding) temperature are numerous and include
increasing the options for overmoulding of temperature sensitive substrates such as polyethylene,
energy saving by operating at lower temperatures,
ability to introduce thermosensitive additives in the silicone elastomer composition,
reducing the thermal gradient in the injection systems and the mold.
The advantages should preferably be provided without significant loss of cure speed.

US2014/0179863 relates to an addition curable silicone rubber composition having self-adhesiveness which is capable of adhering to organic resins such as polyamide, polybuthylene terephthalate (PBT), polycarbonate, polyphenylene oxide, and polyphenylene sulfide.

The addition curable self-adhesive silicone rubber composition can be moulded at a relatively low temperature in a short time and has sufficient pot life for working without sacrificing its rapid curability at low temperature. The molar ratio of inhibitor to the platinum atom disclosed in Example 2 of US2014/0179863 is 38. Incorporation of inhibitor in excess of 1 part by weight of the component (A) may result in retarded curing (see [0085] of US2014/0179863). Sufficient pot life is not realized at a content of less than 0.001 part by weight (of a triazole compound), while the incorporation in excess of 0.1 part by weight may result in the loss of curability (see [0075] of US2014/0179863).

WO2009/088472 provides branched, hydride-terminated siloxanes that are reactive in a polymerizing hydrosilylation reaction at low temperatures on temperature-sensitive support or film, for example, polymeric films made of polyethylene. Examples 14-34 of WO2009/088472 provide for 0.25% surfynol-61 (acetylenic alcohol) and 100 ppm Karstedt's catalyst, which results in a molar ratio inhibitor to Platinum atom of about 94.

U.S. Pat. No. 6,518,371 relates to Si—H functional polyorganosiloxanes and to crosslinkable compositions employing the Si—H functional polyorganosiloxanes together with conventional Si—H functional polyorganosiloxanes. The onset temperature is from 80° C. to 120° C., and the final mixture has a long pot life and processing time of more than 3 days at room temperature.

There is still the need to have low temperature curing composition which are also capable of rapidly curing, while having a long room temperature pot life.

The present invention relates to a liquid curable silicone elastomer composition comprising
an organopolysiloxane (A) containing at least 2 alkenyl groups bonded to silicon atom per molecule,
an organopolysiloxane (B) containing at least 2 silicon-bonded hydrogen atom per molecule, where the at least 2 silicon-bonded hydrogen atom are present on the M siloxy unit of organopolysiloxane (B) and wherein organopolysiloxane (B) is a branched polymer,
a platinum based catalyst (C),
an inhibitor (D) selected from the group consisting of acetylenic alcohols and their derivatives, present in the composition so that the molar ratio of inhibitor to Platinum atom ranges of from 150 to 900 (150:1 to 900:1),
a silica filler (E).

The present invention further relates to a process for preparing a cured silicone elastomer from the liquid curable silicone elastomer composition, and to cured silicone elastomer articles and composite parts obtained therefrom.

The present invention also relates to a method for reducing the curing temperature of a liquid curable silicone elastomer composition by providing for an organopolysiloxane (B) containing at least 2 silicon-bonded hydrogen atom per molecule, where the at least 2 silicon-bonded hydrogen atom are present on the M siloxy unit of organopolysiloxane (B); a platinum based catalyst (C) and an inhibitor (D) selected from the group consisting of acetylenic alcohols and their derivatives, said inhibitor (D) present in the composition so that the molar ratio inhibitor to Platinum atom in the catalyst (C) ranges of from 150 to 900.

The organopolysiloxane (A) may have any structure. The organopolysiloxane (A) may be a linear, branched or resinous polymer.

The organopolysiloxane (A) contains at least 2 alkenyl groups bonded to silicon atom per molecule. Examples of alkenyl groups include vinyl, allyl, butenyl, pentenyl, cyclohexenyl and hexenyl groups. These may be pendent or terminal or at both positions, that is, they may be present on any of the siloxy units of the organopolysiloxane (A).

The viscosity of organopolysiloxane (A) at 25° C. is typically within a range of from 0.1 to 100 Pa·s. Unless otherwise indicated, all viscosities are measured using a rotational viscometer such as a Brookfield viscometer, or by using a capillary rheometer.

The organopolysiloxane (A) may contain phenyl groups.
The organopolysiloxane (A) may contain fluorine containing groups such as trifluoropropyl groups.

Examples of the organopolysiloxane (A) which may be used include vinyldimethylsiloxy-endblocked dimethylsiloxane-vinylmethylsiloxane copolymer, vinyldimethylsiloxy-endblocked polydimethylsiloxane, vinylmethylhydroxysiloxy-endblocked dimethylsiloxane-vinylmethylsiloxane copolymer, and mixtures thereof.

The organopolysiloxane (A) may be either a single polymer, or a combination of two or more different polymers.

The organopolysiloxane (A) is present in the formulation at a level of from 35 to 85% by weight, based on the total weight of the composition.

The organopolysiloxane (B) is a branched polymer containing at least 2 silicon-bonded hydrogen atom per molecule conforming to the general formula (II)

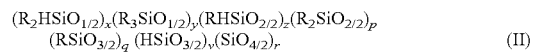

$$(R_2HSiO_{1/2})_x(R_3SiO_{1/2})_y(RHSiO_{2/2})_z(R_2SiO_{2/2})_p(RSiO_{3/2})_q(HSiO_{3/2})_v(SiO_{4/2})_r \qquad (II)$$

where R is as described above (independently selected from hydrogen, aliphatic hydrocarbyl, aromatic hydrocarbyl, or organyl group), and H is hydrogen and where x≥2, y≥0, z≥0, p≥0, v≥0, and at least one of q or r≥1; alternatively x≥2, y≥0, z≥0, p≥0, q≥0; v≥0, r≥1; alternatively, x≥2, y≥0, r≥1 (with the proviso that when r=1, x+y=4) and z, p, q, v=0. Alternatively, x>2, y>0, r>1 and z, p, q, v=0.

In all instances, the organopolysiloxane (B) containing at least 2 silicon-bonded hydrogen atom per molecule carries the at least 2 silicon-bonded hydrogen atom on the so-called "M" unit, represented by the formula ($R_2HSiO_{1/2}$), also abbreviated $M^H$, indicating the M siloxy unit contains at least 1 silicon-bonded hydrogen atom.

In some instances, the organopolysiloxane (B) containing at least 2 silicon-bonded hydrogen atom per molecule on the so-called "M" unit, may additionally carry silicon-bonded hydrogen atoms on the so-called D unit, represented by the formula ($RHSiO_{2/2}$), also abbreviated $D^H$, indicating the D siloxy unit contains at least 1 silicon-bonded hydrogen atom.

In some instances, a linear organopolysiloxane (B') may be present in conjunction with the organopolysiloxane (B). The linear organopolysiloxane (B') may also contain at least 2, alternatively at least 3, silicon-bonded hydrogen atom per molecule. The organopolysiloxane (B') containing at least 2 silicon-bonded hydrogen atom per molecule may carry said silicon-bonded hydrogen atoms on the so-called "M" unit, or on the so-called D unit.

The organopolysiloxane (B) containing at least 2 silicon-bonded hydrogen atom per molecule is free of phenylene skeleton.

The organopolysiloxane (B) may alternatively contain 3 or more silicon-bonded hydrogen atom per molecule.

The organopolysiloxane (B) containing at least 2 silicon-bonded hydrogen atom per molecule may be a single compound or a mixture of compounds, provided that the silicon-bonded hydrogen atoms are found on the so-called M siloxy unit.

Methods to obtain the organopolysiloxane (B) containing at least 2 silicon-bonded hydrogen atom per molecule are known in the art. One example of such method is disclosed in EP0251435, concerned with a method for making siloxane resins containing silicon-bonded hydrogen atoms.

Examples of organopolysiloxane (B) containing at least 2 silicon-bonded hydrogen atom per molecule include compounds of formula ($R_2HSiO_{1/2})_x(SiO_{4/2})_r$, where R is a methyl group, and the ratio x:r ranges of from 0.2:1 to 4:1; in some instances, x may range of from 6 to 10 and r may range of from 3 to 6.

The viscosity of organopolysiloxane (B) at 25° C. is not critical. The viscosity of organopolysiloxane (B) at 25° C. may range of from 0.1 to 1000 mPa·s.

The organopolysiloxane (B) is generally present in the liquid curable silicone elastomer composition in an amount of from 0.1 to 15% by weight, based on the total weight of the composition.

The organopolysiloxane (B) is generally present in the liquid curable silicone elastomer composition in an amount such that the ratio of silicon-bonded hydrogen atom/alkenyl groups in organopolysiloxane (A) ranges of from 1.1 to 3.5, alternatively of from 1.1 to 2.5, alternatively of from 1.1 to 2.0.

Addition-reaction catalysts are well known in the art. These include catalysts selected form the platinum group metals, or transition metals, of the periodic table of the elements, such as platinum, ruthenium, rhodium, palladium, osmium and iridium; and compounds thereof.

The catalyst used in the scope of the present invention may be selected from the platinum based catalysts, such as chloroplatinic acid, chloroplatinic acid dissolved in an alcohol or a ketone and these solutions which have been ripened, chloroplatinic acid-olefin complexes, chloroplatinic acid-alkenylsiloxane complexes, chloroplatinic acid-diketone complexes, platinum black, platinum supported on a carrier, and mixtures thereof.

The catalyst (C) is added in a quantity sufficient to cure the organopolysiloxane (A) and the organopolysiloxane (B) present in the composition. For example, it may be added in a quantity of platinum atom that provides of from 0.1 to 500 weight-ppm (parts per million), alternatively of from 1 to 200 weight-ppm, alternatively of from 1 to 100 weight-ppm, of platinum atom in the catalyst (C) based on the total weight of reactive organopolysiloxanes (A) and (B).

Inhibitors of platinum based catalyst are well known in the art. Addition-reaction inhibitors include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated eneynes, hydroperoxides, nitriles, and diaziridines.

The inhibitors used in the scope of the present invention may be selected from the group consisting of acetylenic alcohols and their derivatives, containing at least one unsaturated bond. Examples of acetylenic alcohols and their derivatives include 1-ethynyl-1-cyclohexanol (ETCH), 2-methyl-3-butyn-2-ol, 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof.

Alternatively, the inhibitor is selected from the group consisting of 1-ethynyl-1-cyclohexanol, 2-methyl-3-butyn-2-ol, 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, and mixtures thereof.

The inhibitor may typically be a acetylenic alcohols where the at least one unsaturated bond (alkenyl group) is in a terminal position, and further, a methyl or phenyl group may be at the alpha position. The inhibitor may be selected from the group consisting of 1-ethynyl-1-cyclohexanol, 2-methyl-3-butyn-2-ol, 3-butyn-1-ol, 3-butyn-2-ol, propargylalcohol, 2-phenyl-2-propyn-1-ol, 1-phenyl-2-propynol, and mixtures thereof.

The inhibitor (D) may be added in the range of from 10 to 50,000 weight-ppm in the curable silicone elastomer composition.

The inhibitor (D) is present in an amount providing a molar ratio of inhibitor to the platinum atom of from 150 to 900, alternatively of from 150 to 700, alternatively of from 150 to 600.

The silica filler suitable for the present invention may have a specific surface area measured by BET method of at least 50 $m^2/g$ up to 450 $m^2/g$. Examples of silica filler include precipitated silica (wet silica), fumed silica (dry silica), calcined silica, and the like. The silica filler may be surface-treated, hydrophilic or hydrophobic. The silica may contain alkenyl group on its surface.

In some instances, the silica contains alkenyl group on its surface. Methods to provide alkenyl groups on silica are known in the art.

The silica filler is present in the composition in an amount of from 10 to 40% by weight, based on the total weight of the composition.

Additives may be present in the composition depending on the intended use of the curable silicone elastomer composition. Examples of additives include electrical conductive fillers, thermally conductive fillers, non-conductive filler different from silica filler (E), pot life extenders, flame retardants, pigments, lubricants, adhesion promoters, mold release agents, diluents, solvents, UV light stabilizers, bactericides, wetting agent, heat stabilizer, compression set additive, plasticizer, etc.

Examples of electrical conductive fillers include metal particles, metal oxide particles, metal-coated metallic particles (such as silver plated nickel), metal coated non-metallic core particles (such as silver coated talc, or mica or quartz) and a combination thereof. Metal particles may be in the form of powder, flakes or filaments, and mixtures or derivatives thereof.

Examples of thermally conductive fillers include boron nitride, alumina, metal oxides (such as zinc oxide, magnesium oxide, aluminium oxide), graphite, diamond, and mixtures or derivatives thereof.

Examples of non-conductive fillers, different from silica filler (E), include quartz powder, diatomaceous earth, talc, clay, calcium carbonate, magnesium carbonate, hollow glass, glass fibre, hollow resin and plated powder, and mixtures or derivatives thereof.

Pot life extenders, such as triazole, may be used, but are not considered necessary in the scope of the present invention. The liquid curable silicone elastomer composition may thus be free of pot life extender.

Examples of chain extender include straight chain organopolysiloxanes containing 2 silicon-bonded hydrogen groups on the terminal position. Such chain extender is different from organopolysiloxane (B).

Examples of flame retardants include aluminium trihydrate, chlorinated paraffins, hexabromocyclododecane, triphenyl phosphate, dimethyl methylphosphonate, tris(2,3-dibromopropyl) phosphate (brominated tris), and mixtures or derivatives thereof.

Examples of pigments include iron oxides, carbon black, and mixtures or derivatives thereof.

Examples of lubricants include tetrafluoroethylene, resin powder, graphite, fluorinated graphite, talc, boron nitride, fluorine oil, silicone oil, molybdenum disulfide, and mixtures or derivatives thereof.

Examples of adhesion promoters include silane coupling agents, such as methyltrimethoxysilane, vinyltrimethoxysilane, allyltrimethoxysilane, and 1,6-bis(trimethylsilyl)hexane.

Further additives include silicone fluids, such as trimethylsilyl or OH terminated siloxanes. Such trimethylsiloxy or OH terminated polydimethylsiloxanes typically have a viscosity<150 mPa·s. When present such silicone fluid may be present in the liquid curable silicone elastomer composition in an amount ranging of from 0.1 to 5% weight, based on the total weight of the composition.

The liquid curable silicone elastomer composition may comprise:
an organopolysiloxane (A) containing at least 2 alkenyl groups bonded to silicon atom per molecule, in an amount of from 35 to 85% by weight, based on the total weight of the composition;
an organopolysiloxane (B) containing at least 2 silicon-bonded hydrogen atom per molecule, where the at least 2 silicon-bonded hydrogen atom are present on the M siloxy unit of organopolysiloxane (B) and wherein organopolysiloxane (B) is a branched polymer, in an amount of from 0.1 to 15% by weight, based on the total weight of the composition;
a platinum based catalyst (C), in a quantity of platinum atom that provides of from 0.1 to 500 weight-ppm (parts per million) of platinum atom in the catalyst (C) based on the total weight of reactive organopolysiloxanes (A) and (B);
an inhibitor (D) selected from the group consisting of acetylenic alcohols and their derivatives, present in the composition so that the molar ratio inhibitor to Platinum atom ranges of from 150 to 900 (150:1 to 900:1), that is, in an amount of from 10 to 50,000 weight-ppm in the curable silicone elastomer composition;
a silica filler (E), in an amount of from 10 to 40% by weight, based on the total weight of the composition;
additives, in an amount of from 0.1 to 10% by weight, based on the total weight of the composition.

In one embodiment, a process for preparing a cured silicone elastomer comprises
1) forming a mixture of the liquid curable silicone elastomer composition, and
2) curing the mixture at a temperature of from 80 to 140° C.

The liquid curable silicone elastomer composition may readily be prepared in conventional mixing equipment. The order of mixing is not critical if the composition is to be used immediately.

The mixture of the liquid silicone rubber composition may be prepared by providing for at least 2 separate parts, such as part I and part II.

Part I may contain the catalyst (C) and any one of the organopolysiloxane (A) or the silica filler (E), or a combination of both.

Part II may contain the inhibitor (D) and the organopolysiloxane (B), and any one of the organopolysiloxane (A) or the silica filler (E), or a combination of the latter two.

In some instances, the catalyst (C) is present in a separate part from the organopolysiloxane (B) and the inhibitor (D).

The other or optional additives may be in any of part I or II or in both parts. They may also be added after parts I and II have been combined.

The mixture may be prepared by providing for at least 3 separate parts, such as part I, part II and part III. Parts I and II may be provided as above. Part III may contain any of organopolysiloxane (A), organopolysiloxane (B), the catalyst (C), the inhibitor (D), the silica filler (E) or specific additives such as pigments, filler different from silica filler (E), which may be present as may be required by the final use of the composition.

Subsequently the different parts are combined together and homogeneously mixed, with the optional subsequent step of the addition of any additional additive as may be required by the final use of the composition.

The dynamic viscosity of the final composition may range of from 5 to 1000 Pa·s, alternatively of from 10 to 500 Pa·s, alternatively of from 50 to 250 Pa·s as measured at room temperature, at a shear rate of 10 s$^{-1}$, using a plate-plate rheometer.

The homogeneous mixing of the components of the present composition may be proceeded to by using a suitable mixing means, such as a spatula, a drum roller, a mechanical stirrer, a three-roll mill, a sigma blade mixer, a bread dough mixer, and a two-roll mill.

The composition may be processed (or cured) by injection moulding, encapsulation moulding, press moulding, dispenser moulding, extrusion moulding, transfer moulding, press vulcanization, centrifugal casting, calendering, bead application or blow moulding.

The composition may alternatively be processed (or cured) using a 3D printing method. A typical method of forming a three-dimensional (3D) article may comprise multiple steps. For example, the method may comprise (i) printing a first heat-curable silicone composition with a 3D printer to form a layer. The method may further comprise (ii) heating the layer to form an at least partially cured layer. In addition, the method may comprise (iii) printing a second heat-curable silicone composition on the at least partially cured layer with the 3D printer to form a subsequent layer. The method may also comprise (iv) heating the subsequent layer to form an at least partially cured subsequent layer. Optionally, steps iii) and iv) may be repeated with independently selected curable silicone composition(s) for any additional layer(s) to form the 3D article. The first and second heat-curable silicone compositions may be the same as or different from one another.

Advantages of the liquid curable silicone elastomer compositions of the present invention include extrudability which makes them adaptable to moulding processes such as liquid injection moulding at low pressures and low temperatures, improved pot-life, and improved mold release.

The pot life at 25° C. of the liquid curable silicone elastomer composition is >5 hours, alternatively >12 hours, alternatively >24 hours, alternatively >36 hours, alternatively >48 hours, alternatively >72 hours, alternatively >5 days.

The pot life of the present liquid curable silicone elastomer composition is defined as the time to increase mixed viscosity of the composition to 200% of its initial value, as measured by a plate-plate rheometer at a shear-rate of $10s^{-1}$, at 25° C. This parameter denotes the minimum processing time.

Curing of the liquid curable silicone elastomer composition may alternatively be carried out a temperature of from 90 to 130° C., alternatively of from 90 to 120° C., alternatively of from 100 to 120° C., alternatively of from 105 to 115° C.

The Tc2 curing onset time, ie. 2% of maximum torque, at 100° C., is <100 seconds, alternatively <80 seconds, alternatively <50 seconds.

The Tc50 (defined as the time to reach 50% of the maximum torque at 100° C.) is <150 seconds, alternatively <80 seconds.

The progress of the cure reaction can be assessed at several occurrences. The cure monitoring parameters are derived from a movable die rheometer (MDR) experiment using ASTM D5289-92.

Curing can for example take place in a mold to form a moulded silicone article. The composition may for example be injection moulded to form an article, or the composition can be overmoulded by injection moulding around an article or over a substrate. When cured in presence of a heat sensitive substrate, the silicone elastomer composition of the present invention is cured under such conditions enabling development of mechanical adhesion with the heat sensitive substrate and the like, and more specifically, by using a temperature and curing time at which the heat sensitive substrate is not deformed, melted, or denatured.

The cured silicone elastomer obtained from the liquid curable silicone elastomer composition typically has a hardness (durometer)<75 Shore A.

In one embodiment, the present invention relates to an article cured from the liquid curable silicone elastomer composition. Such articles include those that may be used in producing sports products, diving masks, ventilator bellows, balloon catheters, rubber teats, pacifiers, thin-walled membranes, switch covers, spark-plug connectors, medical products and devices, electrical insulators, single-wire seals, plug connector seals, tubing and valves, automobile components such as connector seal and spark plug boots, electric and electronic parts such as rolls in a copying machine and packing in a microwave oven; as well as other products such as feeding bottle nipple and diving gears, in view of the high heat resistance, cold resistance, safety, electric insulation, weatherability, and the like.

The article may be a 3D printed article, obtained from a 3D printing method.

The liquid curable silicone elastomer composition may be cured into silicone elastomer articles, such as tubes, strips, solid cord or custom profiles according to the size specifications of the manufacturer.

The cured silicone elastomer obtained from curing the liquid curable silicone elastomer composition of the present invention may provide for composite parts where mechanical bonding to a substrate occurs.

In one embodiment, the present invention relates to a composite part comprising a silicone elastomer cured from the liquid curable silicone elastomer composition on a substrate.

The substrate may be rigid or flexible. Examples of substrates include plastic substrates, thermoplastic substrates, metal substrates, and textile substrates.

Examples of plastic substrates and thermoplastic substrates (also organic resins) include acrylonitrile-butadiene-styrene, polyphenylene/styrene blends, polystyrenes, polycarbonate, polyurethane, styrene resin, polyethylene, polypropylene, acrylic, polyacrylamides, polyesters, polyethylene terephthalate, polybutylene terephthalate, polyphenylene oxide, polyphenylene sulfide, polysulfone, nylon, polyamide, polyimide, fluoropolymers, and liquid crystal resin, non-resin containing polyetherimides.

Examples of metal substrates include metal substrates selected from copper, alclad aluminum, anodized aluminum, galvanized steel, cold-rolled steel, cast aluminum, and cast magnesium.

Examples of textile substrates include natural or synthetic knit, woven or non-woven fabric made of materials such as cotton, polyamide, wool, nylon, polyester.

Such composite parts include those constructions where any of a plastic substrate or thermoplastic substrate and a silicone elastomer are used as an integral component. Examples of such composite parts can be found in various industries including, but not limited to, automotive applications, medical applications, consumer and industrial applications, electronic applications. In automotive applications, this may include housings with a silicone seal or gasket, plugs and connectors, components of various sensors, membranes, diaphragms, climate venting components, and the like. In medical applications composite parts may be used in devices such as masks, goggles, tubing and valves catheters, ostomy appliances, respiratory appliances, feeding appliances, contact lenses, hearing aids, orthotics, prosthesis, and the like. In consumer and industrial applications composite parts may be found in shower heads, bakery ware, spatulas, home appliances, shoes, goggles, sports and leisure articles, diving masks, face masks, pacifiers and other baby articles, feeding accessories, seals and surfaces of white good and other kitchen articles, and the like. Electronic applications may include mobile phone cover seal, mobile phone accessories, precision electronic equipment, electrical switches and switch covers, watches and wristbands, wearable electronic devices, and the like.

The liquid curable silicone elastomer composition of this invention may be applied to the surface of the substrate by any suitable means such as rolling, spreading, spraying, and the like, and cured as described above. After application of the composition onto the substrate, the liquid curable silicone elastomer composition is cured at the cure temperature ranging of from 80 to 140° C., alternatively from 90 to 130°

C., alternatively from 90 to 120° C., alternatively of from 100 to 120° C., alternatively of from 105 to 115° C.

When the liquid curable silicone elastomer composition is used for textile coating, such as airbag coating, the composition may be applied by any coating technique, including roller application, curtain coating, spray coating, knife coating or calendering.

In one embodiment, a method for reducing the curing temperature of a liquid curable silicone elastomer composition is provided, which includes providing for an organopolysiloxane (B) containing at least 2 silicon-bonded hydrogen atom per molecule, where the at least 2 silicon-bonded hydrogen atom are present on the M siloxy unit of organopolysiloxane (B); a platinum based catalyst (C) and an inhibitor (D) selected from the group consisting of acetylenic alcohols and their derivatives, said inhibitor (D) present in the composition so that the molar ratio inhibitor to Platinum atom in the catalyst (C) ranges of from 150 to 900.

In one embodiment, the use of a liquid curable silicone elastomer composition as described above is provided to make an article or a composite part as described above.

The present liquid curable silicone elastomer composition thus provides for multiple and simultaneous advantages:
1) the liquid curable silicone elastomer composition is able to cure at a temperature ranging of from 80 to 140° C., alternatively of from 90 to 130° C., alternatively of from 90 to 120° C., alternatively of from 100 to 120° C., alternatively of from 105 to 115° C.;
2) the liquid curable silicone elastomer composition has a pot life of >5 hours, alternatively >12 hours, alternatively >24 hours, alternatively >36 hours, alternatively >48 hours, alternatively >72 hours, alternatively >5 days, at 25° C.;
3) the curing onset time (Tc2) of the liquid curable silicone elastomer composition is <100 s, alternatively <80 s, alternatively <50 sec at 100° C.
4) Tc50 is <150 seconds, alternatively <80 seconds.

Even though the curing onset time (Tc2) of the present liquid curable silicone elastomer composition is less than 100 seconds, the cured silicone elastomer obtained from curing said composition satisfies the typical properties of mechanical strength elongation at break, tear resistance, processability.

EXAMPLES

Cure Monitoring

Cure was monitored on a Monsanto Model MDR 2000 Moving Die Rheometer using ASTM D5289-92, at 25° C. Approximately 5 g of material was placed between two sheets of 0,0254 mm (=1 mil) Dartek nylon and placed in the pre-heated rheometer. Tc2, Tc10, Tc50 were recorded.

Calculation Method for the Molar Ratio Inhibitor to Platinum Atom

Calculation method for the molar ratio inhibitor to Platinum atom: the Karstedt catalyst has formula $Pt_2[(Me_2SiCH=CH_2)_2O]_3$, with M(Karstedt catalyst)=949.4 g/mol. The relative percentage of Platinum atom in Karstedt's catalyst is 2*M(Pt)/M(Karstedt catalyst)=41.1%, where M(Pt) is 195.08 g/mol. The molar amount was then derived by the known formula n(Pt)=m(Pt)/M(Pt), where m denotes the mass (in grams), and M the molar mass (in units of moles/gram). The molar amount of inhibitor was calculated similarly by taking into the account the molar mass M of the respective inhibitor molecule.

Potlife is assessed at 25° C., unless otherwise indicated.

Component Description

A1: vinyl terminal polydimethylsiloxane having a viscosity of approximately 53,000 mPa·s A2: Vinyl terminal poly(dimethylsiloxane-co-methylvinylsiloxane) having a viscosity of 370 mPa·s and 1.16 wt. % vinyl.

B1: $HMe_2SiO_{0.5}$ capped $M^HQ$ resin having 0.97 wt. % H as SiH and a viscosity of 25 mPa·s—B1 is a crosslinker having the hydrogen atom bonded to a silicon on the M siloxy unit B2: $Me_3SiO_{0.5}$ terminal poly(dimethyl-co-methylhydrogen)siloxane having 0.80 wt. % H as SiH and a viscosity of ~15 mPa·s—B2 is a crosslinker having the hydrogen atom bonded to a silicon on the D siloxy unit C: Karstedt's catalyst (divinyltetramethyldisiloxane complex of platinum)

D: Inhibitor as defined in the examples

Further additive: OH terminal PDMS with a viscosity of approximately 21 mPa·s

Masterbatches were prepared as follows and described as MBx:

MB1 contains 68.0 parts of a dimethylvinylsiloxy terminated polydimethylsiloxane (A1) having a viscosity of about 55 Pa·s at 25° C., and 24.8 parts of a fumed silica filler (E) having a surface area of approximately 300 m²/g. The silica is hydrophobized and has a vinyl functionalization of approximately 0.079 mmol/g.

MB2 contains 70.8 parts of a dimethylvinylsiloxy terminated polydimethylsiloxane (A1) having a viscosity of about 55 Pa·s at 25° C., and 22.4 parts of a fumed silica filler (E) having a surface area of approximately 300 m²/g. The silica is hydrophobized and contains no vinyl functionalization.

MB3 contains 66.6 parts of a dimethylvinylsiloxy terminated polydimethylsiloxane (A1) having a viscosity of about 55 Pa·s at 25° C., and 25.8 parts of a fumed silica filler (E) having a surface area of approximately 300m²/g. The silica is hydrophobized and has a vinyl functionalization of approximately 0.178 mmol/g.

The liquid curable silicone elastomer compositions were prepared using these masterbatches by adding further components A, B (crosslinker), D (inhibitor) into a first part, and components A, C (Platinum catalyst) into a second part to prepare a 2-part system well known to persons skilled in the art. The components of each part were blended at room temperature and mixed to full homogeneity to yield the liquid curable silicone elastomer compositions described in the examples below. All compositions are at a sum of 100% wt±0.2% due to weighting variation during preparation of the compositions.

Comparative Examples 1 to 5

Comparative examples 1 to 5, disclosed in Table 1 as C1 to C5, correspond to liquid curable silicone elastomer compositions having a molar ratio inhibitor to Platinum atom<150, such as used in typical silicone elastomer technology. A cure speed as Tc 2<100 seconds and long potlife>5 hours cannot be achieved simultaneously. In each case, either one of the parameter is negatively impacted: when potlife is >5 hours, Tc2 is >100 seconds such as in C2 and C4. When Tc2 is <100 seconds, potlife is <5hours such as in C1, C3 and C5.

TABLE 1

|  |  | C1 | C2 | C3 | C4 | C5 |
|---|---|---|---|---|---|---|
| INGREDIENTS |  |  |  |  |  |  |
| Silica masterbatch MB1 | wt % | 87.95 | 87.95 | 87.95 | 87.90 | 87.90 |
| Polymer A1 | wt % | 5.39 | 5.34 | 5.63 | 5.26 | 5.57 |
| Polymer A2 | wt % | 5.09 | 5.05 | 5.05 | 5.05 | 5.06 |
| Crosslinker B1 (M(H)) | wt % |  |  | 1.16 |  | 1.22 |
| Crosslinker B2 (D(H)) | wt % | 1.39 | 1.45 |  | 1.53 |  |
| Pt catalyst C | wt % | 0.00250 | 0.00250 | 0.00250 | 0.00250 | 0.00250 |
| Inhibitor D | wt % | 0.01035 | 0.04130 | 0.04130 | 0.08260 | 0.08260 |
| Inhibitor | name | ETCH | ETCH | ETCH | ETCH | ETCH |
| PARAMETERS |  |  |  |  |  |  |
| Molar ratio Inhibitor/Pt |  | 16 | 63 | 63 | 127 | 127 |
| Tc2 at 100° C. | seconds | 33 | 244 | 14 | >600 | 23 |
| Tc10 at 100° C. | seconds | 38 | 260 | 18 | >600 | 27 |
| Tc50 at 100° C. | seconds | 47 | 296 | 24 | >600 | 34 |
| Potlife (25° C.) | hours | <1 | >72 | <1 | >72 | <5 |

Examples 1 to 3 and Comparative Example 6

Examples 1 to 3, disclosed in Table 2, correspond to liquid curable silicone elastomer compositions having a molar ratio inhibitor to Platinum atom ranging of from 150 to 900, in accordance with the present invention. A cure speed as Tc 2<100 seconds and long potlife>5 hours are achieved simultaneously.

Such achievements of simultaneous potlife>5 hours temperature cure of 100° C. (between 80 to 140° C.), and Tc2<100 seconds are achieved within the claimed range of the molar ratio inhibitor to Platinum atom ranging of from 150 to 900.

In Comparative example C6, also disclosed in Table 2, the liquid curable silicone elastomer compositions has a molar ratio inhibitor to Platinum atom>1000, above the claimed range of 150 to 900. A cure speed as Tc 2<100 seconds and long potlife>5 hours cannot be achieved simultaneously.

alkyne group in terminal position. A cure speed as Tc 2<100 seconds and long potlife>5 hours or >24 hours and for Example 7, >72 hours, can be achieved simultaneously, when cured at 100° C.

The compositions of Examples 4 to 7 were assessed for their viscosity after 1 hour, 5 hours, 24 hours, 48 hours and 72 hours. The initial measurement at 1 hour is the reference point for the viscosity evolution over time, when the noise due to mixing can be considered negligible. As disclosed previously, the pot life of the present liquid curable silicone elastomer composition is defined as the time to increase the mixed viscosity of the composition to 200% of its initial value, as measured by a plate-plate rheometer at a shear-rate of $10^{s-1}$, at 25° C.

TABLE 2

|  |  | Example 1 | Example 2 | Example 3 | C6 |
|---|---|---|---|---|---|
| INGREDIENTS |  |  |  |  |  |
| Silica masterbatch MB2 | wt % | 17.58 | 17.58 | 17.58 | 17.58 |
| Silica masterbatch MB3 | wt % | 70.32 | 70.32 | 70.32 | 70.32 |
| Polymer A1 | wt % | 5.38 | 5.42 | 5.28 | 5.42 |
| Polymer A2 | wt % | 5.06 | 5.06 | 5.06 | 5.06 |
| Crosslinker B1 | wt % | 1.50 | 1.50 | 1.59 | 1.5 |
| Pt catalyst C (Karstedt) | wt % | 0.00125 | 0.00062 | 0.00062 | 0.00062 |
| Inhibitor D | wt % | 0.08260 | 0.08260 | 0.13725 | 0.16520 |
| Inhibitor | name | ETCH | ETCH | ETCH | ETCH |
| Crosslinker M(H) or D(H) | type | M(H) | M(H) | M(H) | M(H) |
| PARAMETERS |  |  |  |  |  |
| Molar ratio Inhibitor/Pt |  | 253 | 509 | 839 | 1018 |
| Tc2 at 100° C. | seconds | 37 | 61 | 92 | 129 |
| Tc10 at 100° C. | seconds | 44 | 76 | 108 | 151 |
| Tc50 at 100° C. | seconds | 53 | 106 | 136 | 195 |
| Potlife (25° C.) | hours | >5 | >24 | >72 | >>72 |

Examples 4 to 7

Examples 4 to 7, disclosed in Table 3, correspond to liquid curable silicone elastomer compositions having a molar ratio inhibitor to Platinum atom ranging of from 150 to 900 (150:1 to 900:1), in accordance with the present invention. The inhibitor is selected from acetylenic alcohols with the Example 4 has a potlife of >24 hours, as its mix viscosity has more than doubled when assessed after 48 hours. That is, after 24 hours, the mix viscosity of Example 4=388 Pa·s, which is <200% of the initial mix viscosity of 252 Pa·s; while after 48 hours the mix viscosity=539 Pa·s, ie >200%. It is to be noted that a mix viscosity of 703 Pa·s after 72 hours is nevertheless still considered processable in typical injection moulding equipment.

TABLE 3

|  |  | Example 4 | Example 5 | Example 6 | Example 7 |
|---|---|---|---|---|---|
| INGREDIENTS |  |  |  |  |  |
| Silica masterbatch MB2 | wt % | 17.48 | 17.48 | 17.48 | 17.48 |
| Silica masterbatch MB3 | wt % | 69.90 | 69.90 | 69.90 | 69.90 |
| Polymer A1 | wt % | 5.60 | 5.43 | 5.42 | 5.38 |
| Polymer A2 | wt % | 5.14 | 5.03 | 5.03 | 5.03 |
| Crosslinker B1 | wt % | 1.15 | 1.49 | 1.49 | 1.49 |
| Pt catalyst C (Karstedt) | wt % | 0.00062 | 0.00062 | 0.00062 | 0.00062 |
| Inhibitor D | wt % | 0.05564 | 0.03707 | 0.04634 | 0.08738 |
| Inhibitor D | name | Methylbutynol | Propargylalcohol | 3-Butynol | 1-Phenyl-2-propyn-1-ol |
| OH terminal PDMS | wt % | 0.60 | 0.60 | 0.60 | 0.60 |
| PARAMETERS |  |  |  |  |  |
| Molar ratio Inhibitor/Pt |  | 506 | 509 | 508 | 509 |
| Tc2 at 100° C. | seconds | 77 | 45 | 61 | 70 |
| Tc10 at 100° C. | seconds | 92 | 60 | 75 | 84 |
| Tc50 at 100° C. | seconds | 121.00 | 91.00 | 104 | 112 |
| Mix viscosity (1 hr) | Pa · s | 252 | 272 | 245 | 243 |
| Mix viscosity (5 hrs) | Pa · s | 297 | 394 | 279 | 245 |
| Mix viscosity (24 hrs) | Pa · s | 388 | cured | 324 | 252 |
| Mix viscosity (48 hrs) | Pa · s | 539 | cured | 439 | 311 |
| Mix viscosity (72 hrs) | Pa · s | 703 | cured | 637 | 324 |
| Potlife (25° C.) | hours | >24 | >5 | >48 | >72 |

Comparative Example 7 to 11

Comparative examples C7 to C9, disclosed in Table 4, correspond to liquid curable silicone elastomer compositions having diethylmaleate as inhibitor, which is not selected from the group consisting of acetylenic alcohols and their derivatives; at different molar ratio inhibitor to Platinum atom. A cure speed as Tc 2<100 seconds and long potlife>5 hours cannot be achieved simultaneously.

Comparative examples C10 and C11, also disclosed in Table 4, correspond to liquid curable silicone elastomer compositions having further inhibitors, which are not selected from the group consisting of acetylenic alcohols and their derivatives; at a molar ratio inhibitor to Platinum atom of 509. A cure speed as Tc 2<100 seconds and long potlife>5 hours cannot be achieved simultaneously, when curing at 100° C.

Examples 8 and 9, Comparative Example 12

Comparative example 12 is a reproduction of Example 2 of US2014/0179863. Examples 8 and 9 according to the invention illustrate the benefits of the ratio molar ratio inhibitor to Platinum atom ranging of from 150 to 900. The potlife of Examples 8 and 9 is >48 hours. A significant extension of potlife can be achieved at a given curing rate (all examples Tc10=34-35 seconds at 110° C.), and even in absence of a triazole compound as "reaction inhibiting agent", such as benzotriazole as used in Comparative example 12.

TABLE 4

|  |  | C7 | C8 | C9 | C10 | C11 |
|---|---|---|---|---|---|---|
| INGREDIENTS |  |  |  |  |  |  |
| Silica masterbatch MB1 | wt % | — | 87.90 | — | — | — |
| Silica masterbatch MB2 | wt % | 17.58 | — | 17.58 | 17.58 | 17.58 |
| Silica masterbatch MB3 | wt % | 70.32 | — | 70.32 | 70.32 | 70.32 |
| Polymer A1 | wt % | 5.50 | 5.7 | 5.39 | 5.39 | 5.39 |
| Polymer A2 | wt % | 5.05 | 5.06 | 5.05 | 5.06 | 5.06 |
| Crosslinker B1 | wt % | 1.50 | 1.22 | 1.5 | 1.50 | 1.50 |
| Pt catalyst C (Karstedt) | wt % | 0.00062 | 0.00125 | 0.00062 | 0.00062 | 0.00062 |
| Inhibitor D | wt % | 0.00504 | 0.04130 | 0.11453 | 0.11460 | 0.11326 |
| Inhibitor | name | Diethylmaleate | Diethylmaleate | Diethylmaleate | Diethylfumarate | Diethyl-acetylen-dicarboxylate |
| PARAMETERS |  |  |  |  |  |  |
| Molar ratio Inhibitor/Pt |  | 22 | 91 | 509 | 509 | 509 |
| Tc2 at 100° C. | seconds | 65 | 202 | >500 | >500 | 283 |
| Tc10 at 100° C. | seconds | 93 | 294 | >500 | >500 | 369 |
| Tc50 at 100° C. | seconds | 149 | 372 | >500 | >500 | 484 |
| Potlife (25° C.) | hours | <1 | <24 | >>72 | >>72 | <5 |

TABLE 5

|  | Example 8 | Example 9 | Comparative example 12 = Example 2 of US2014/0179863 |
|---|---|---|---|
| INGREDIENTS |  |  |  |
| Organopolysiloxane (B) | M(H)Q | M(H)Q | D, D(H), M(H) endcapped (Dimethylsiloxane-methylhydrogensiloxane copolymer) |
| Pt atom (%) | 0.000510 | 0.0004 | 0.00189 (0.0025 parts) |
| Inhibitor type | ETCH | 1-Phenyl-2-propynol | ETCH |
| Inhibitor (%) | 0.165200 | 0.0879 | 0.0452 (0.06 parts) |
| Benzotriazole (%) (reaction inhibiting agent) | 0 | 0 | 0.004 |
| PARAMETERS |  |  |  |
| Molar ratio Inhib/Pt | 505 | 335 | 38 |
| Cure temperature (° C.) | 110 | 110 | 110 |
| Tc10 (seconds) | 35 | 34 | 34 |
| Potlife (25° C.) (hours) | >48 | >48 | >12 |

The invention claimed is:

1. A liquid curable silicone elastomer composition comprising:
   an organopolysiloxane (A) containing at least two silicon-bonded alkenyl groups per molecule;
   an organopolysiloxane (B) containing M siloxy units and at least three silicon-bonded hydrogen atoms per molecule, wherein the at least three silicon-bonded hydrogen atoms are present on the M siloxy units of the organopolysiloxane (B), and the organopolysiloxane (B) is a branched polymer;
   a platinum based catalyst (C);
   an inhibitor (D), wherein the inhibitor (D) is selected from the group consisting of acetylenic alcohols and their derivatives, and is present in the liquid curable silicone elastomer composition in an amount to provide a molar ratio of the inhibitor (D) to platinum in the catalyst (C) of from 150 to 900 (150:1 to 900:1); and
   a silica filler (E);
   wherein the organopolysioxane (B) is of the general formula (IIa);

$(R_2HSiO_{1/2})_x(R_3SiO_{1/2})_y(RSiO_{3/2})_q(SiO_{4/2})_r$ (IIa);

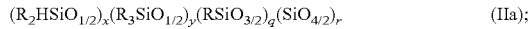

where each R is independently selected from an aliphatic or aromatic hydrocarbyl group, H is a hydrogen atom, x≥3, y≥0, q≥0, and r≥0, provided that when q=0, r>0, and when r=0, q >0; and
   wherein the organopolysiloxane (B) comprises a HMe$_2$SiO$_{1/2}$ capped M$^H$Q resin, wherein Me is a methyl group.

2. The liquid curable silicone elastomer composition of claim 1, wherein the inhibitor (D) contains at least one unsaturated bond, optionally wherein the at least one unsaturated bond of the inhibitor (D) is in a terminal position.

3. The liquid curable silicone elastomer composition of claim 1, wherein the inhibitor (D) is selected from the group consisting of 1-ethynyl-1-cyclohexanol, 2-methyl-3-butyn-2-ol, 3-butyn-1-ol, 3 -butyn-2-ol, propargylalcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof.

4. The liquid curable silicone elastomer composition of claim 1, wherein the molar ratio of the inhibitor (D) to platinum in the catalyst (C) is from 150 to 600 (150:1 to 600:1).

5. The liquid curable silicone elastomer composition of claim 1, wherein x≥3, y=0, q=0, and r≥1.

6. The liquid curable silicone elastomer composition of claim 5, wherein the ratio of x:r ranges from 0.2:1 to 4:1.

7. The liquid curable silicone elastomer composition of claim 1, wherein the ratio of silicon-bonded hydrogen atoms in organopolysiloxane (B)/alkenyl groups i n organopolysiloxane (A) is from 1.1 to 3.5.

8. The liquid curable silicone elastomer composition of claim 1, wherein the silica filler (E) contains at least one alkenyl group on its surface.

9. The liquid curable silicone elastomer composition of claim 1, further comprising an adhesion promoter.

10. The liquid curable silicone elastomer composition of claim 1, provided in at least two separate parts.

11. An article formed by curing the liquid curable silicone elastomer composition according to claim 1.

12. A composite part comprising a silicone elastomer formed by curing the liquid curable silicone elastomer composition according to claim 1 on a substrate.

13. The composite part of claim 12, wherein the substrate is selected from the group consisting of plastic substrates, thermoplastic substrates, metal substrates, and textile substrates.

14. The composite part of claim 13, wherein a plastic substrate or a thermoplastic substrate and the silicone elastomer are an integral component.

15. A method of forming a three-dimensional (3D) article, the method comprising:
   i) printing a first heat-curable silicone composition with a 3D printer to form a layer;
   ii) heating the layer to form an at least partially cured layer;
   iii) printing a second heat-curable silicone composition on the at least partially cured layer with the 3D printer to form a subsequent layer; and
   iv) heating the subsequent layer to form an at least partially cured subsequent layer;
   v) optionally, repeating steps iii) and iv) with independently selected heat-curable silicone composition(s) for any additional layer(s) to form the 3D article;
   wherein the first and second heat-curable silicone compositions are the same as or different from one another; and wherein at least one of the first and second heat-curable silicone compositions is a liquid curable silicone elastomer composition comprising:

an organopolysiloxane (A) containing at least two silicon-bonded alkenyl groups per molecule;

an organopolysiloxane (B) containing M siloxy units and at least three silicon-bonded hydrogen atoms per molecule, wherein the at least three silicon-bonded hydrogen atoms are present on the M siloxy units of the organopolysiloxane (B), and the organopolysiloxane (B) is a branched polymer;

a platinum based catalyst (C);

an inhibitor (D), wherein the inhibitor (D) is selected from the group consisting of acetylenic alcohols and their derivatives, and is present in the liquid curable silicone elastomer composition in an amount to provide a molar ratio of the inhibitor (D) to platinum in the catalyst (C) of from 150 to 900 (150:1 to 900:1); and a silica filler (E);

wherein the organopolysiloxane (B) is of the general formula (IIa):

$$(R_2HSiO_{1/2})_x(R_3SiO_{1/2})_y(RSiO_{3/2})_q(SiO_{4/2})_r \quad \text{(IIa)};$$

where each R is independently selected from an aliphatic or aromatic hydrocarbyl group, H is a hydrogen atom, x≥3, y≥0, q≥0, and r≥0, provided that when q=0, r>0, and when r=0, q >0.

16. The liquid curable silicone elastomer composition of claim 1, wherein the organopolysiloxane (B) is free of pendant silicon-bonded hydrogen atoms.

17. A composite part comprising a silicone elastomer formed by curing a liquid curable silicone elastomer composition on a substrate, the liquid curable silicone elastomer composition comprising:

an organopolysiloxane (A) containing at least two silicon-bonded alkenyl groups per molecule;

an organopolysiloxane (B) containing M siloxy units and at least three silicon-bonded hydrogen atoms per molecule, wherein the at least three silicon-bonded hydrogen atoms are present on the M siloxy units of the organopolysiloxane (B), and the organopolysiloxane (B) is a branched polymer;

a platinum based catalyst (C);

an inhibitor (D), wherein the inhibitor (D) is selected from the group consisting of acetylenic alcohols and their derivatives, and is present in the liquid curable silicone elastomer composition in an amount to provide a molar ratio of the inhibitor (D) to platinum in the catalyst (C) of from 150 to 900 (150:1 to 900:1); and a silica filler (E);

wherein the organopolysiloxane (B) is of the general formula (IIa):

$$(R_2HSiO_{1/2})_x(R_3SiO_{1/2})_y(RSiO_{3/2})_q(SiO_{4/2})_r \quad \text{(IIa)};$$

where each R is independently selected from an aliphatic or aromatic hydrocarbyl group, H is a hydrogen atom, x≥3, y≥0, q≥0, and r≥0, provided that when q=0, r≥0, and when r=0, q >0;

wherein the substrate is selected from the group consisting of plastic substrates, thermoplastic substrates, metal substrates, and textile substrates; and wherein a plastic substrate or a thermoplastic substrate and the silicone elastomer are an integral component.

18. The composite part of claim 17, wherein the inhibitor (D) is selected from the group consisting of 1-ethynyl-1-cyclohexanol, 2-methyl-3-butyn-2-ol, 3-butyn-1-ol, 3-butyn-2-ol, propargylalcohol, 2-phenyl-2-propyn-1-ol, 3 ,5-dimethyl- 1-hexyn-3 -ol, 1-ethynylcyclopentanol, 1-phenyl-2-propynol, 3-methyl-l-penten-4-yn-3-ol, and mixtures thereof.

19. The composite part of claim 17, wherein:
i) the molar ratio of the inhibitor (D) to platinum in the catalyst (C) is from 150 to 600 (150:1 to 600:1);
ii) the ratio of silicon-bonded hydrogen atoms in organopolysiloxane (B) /alkenyl groups in organopolysiloxane (A) is from 1.1 to 3.5; or iii) both i) and ii).

20. The composite part of claim 17, wherein:
i) x≥3, y=0, q=0, and r≥1;
ii) the ratio of x:r ranges from 0.2:1 to 4:1; or
iii) both i) and ii).

* * * * *